Figure 1:
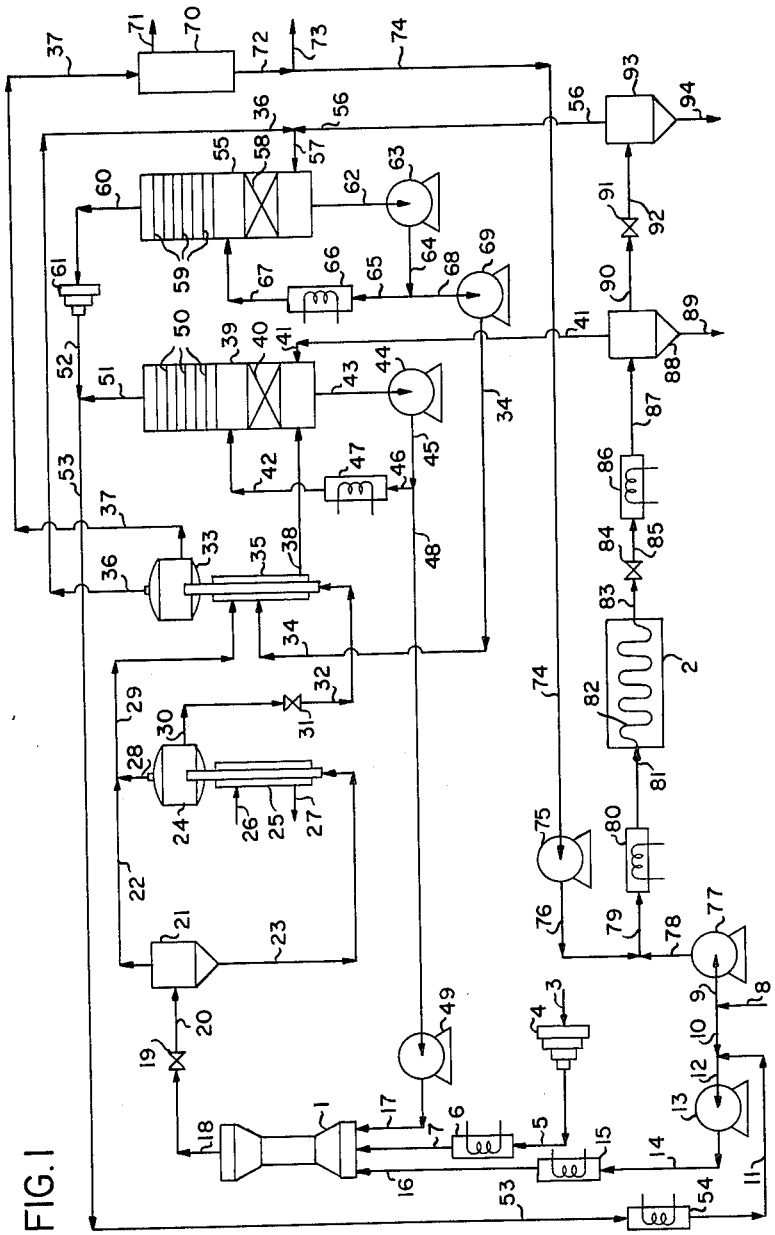

March 8, 1966  L. H. COOK ETAL  3,239,522
SYNTHESIS OF UREA AND MELAMINE
Filed March 12, 1963  2 Sheets-Sheet 1

LUCIEN H. COOK
IVO MAVROVIC
*INVENTORS*

BY J. I. Chalot

AGENT

United States Patent Office 3,239,522
Patented Mar. 8, 1966

3,239,522
SYNTHESIS OF UREA AND MELAMINE
Lucien H. Cook, Port Washington, and Ivo Mavrovic, New York, N.Y., assignors to Chemical Construction Corporation, New York, N.Y., a corporation of Delaware
Filed Mar. 12, 1963, Ser. No. 264,637
9 Claims. (Cl. 260—249.7)

This invention relates to the production of melamine from urea. A combined process sequence is provided, in which the melamine synthesis off-gas is integrated into the urea synthesis process, so as to provide a complete recycle process.

The synthesis of melamine from urea is carried out by heating molten urea at elevated temperature and pressure, and generally in the presence of excess ammonia. The process reaction is commonly expressed according to Equation 1:

(1)     $6CO(NH_2)_2 \rightarrow C_3N_6H_3 + 3CO_2 + 6NH_3$

The reaction products are initially produced in the vapor or gaseous state, and the melamine is readily separated from the byproduct ammonia and carbon dioxide as a solid by cooling the gas stream. The residual gas phase must be treated in some suitable manner, so as to recover its ammonia content in a usable form.

One approach to the treatment of melamine off-gas is described in U.S. Patent 2,950,173. In this case, the off-gas is scrubbed with a liquid organic solvent. Solid ammonium carbamate is thus removed in the liquid solvent, and a residual gas phase consisting of pure anhydrous ammonia is also produced. The ammonium carbamate may be reconverted to urea, while the ammonia is suitable for reuse in melamine synthesis. Another usage for the melamine off-gas is in the production of ammonium sulfate or ammonium nitrate fertilizer by contacting the off-gas with sulfuric acid or nitric acid respectively.

In the present invention, the melamine off-gas is utilized in a novel manner, by integrating this off-gas into a complete recycle urea synthesis process. The melamine off-gas is combined with the off-gas produced by ammonium carbamate decomposition in urea synthesis, and the combined off-gas is then processed for recycle to urea synthesis. In a preferred embodiment, the urea synthesis off-gas is produced in a plurality of stages at different pressure levels. In this case, the melamine off-gas is removed for recycle in a plurality of stages at pressures corresponding to those of the urea synthesis off-gas. Thus, partial gas streams are combined at each pressure level and subsequently recycled to urea synthesis. The actual recycle of the combined gas streams to urea synthesis may be carried out in any suitable manner, however, two preferred methods of off-gas recycle will be described infra.

The process of the present invention possesses a noteworthy advantage in that complete recycle of melamine off-gas is achieved without the use of external solvents. In addition, makeup ammonia for the urea synthesis may be passed directly to melamine synthesis and subsequently recycled to urea synthesis. This is advantageous because the incoming fresh ammonia is generally totally anhydrous and of maximum purity. Since the presence of water in melamine synthesis is objectionable, the use of fresh ammonia in melamine synthesis with subsequent recycle of excess ammonia to urea synthesis is highly advantageous. A further advantage of the present invention is that the energy in melamine off-gas derived at elevated pressure is conserved, by recycling the off-gas to the urea recycle system in a plurality of stages at different pressure levels rather than expanding the entire melamine process stream to a low pressure level. This latter advantage is obtained when urea synthesis off-gas is generated in a plurality of stages at different pressure levels. This is generally the case, although theoretically the decomposition of ammonium carbamate and the generation of urea synthesis off-gas could be carried out in one stage of pressure. Finally, the process of the present invention is advantageous because the process is simpler and involves fewer process units, due to the combined processing of both types of off-gas.

It is an object of the present invention to produce urea and melamine in a combined process, with combined recycle of process off-gas.

Another object is to recycle and utilize melamine synthesis off-gas in an improved manner.

A further object is to conserve the pressure levels of melamine synthesis off-gas, by recycling the off-gas without pressure reduction in a plurality of stages.

An additional object is to integrate melamine and urea synthesis so as to employ fresh incoming ammonia in melamine synthesis with eventual recycle of this ammonia to urea synthesis.

These and other objects and advantages of the present invention will become evident from the description which follows. Referring to the figures, FIGURE 1 is a flow diagram of melamine synthesis, integrated with a urea synthesis process, in which off-gas is divided into pure ammonia and aqueous ammonium carbamate recycle solution, and FIGURE 2 is a flow diagram of urea and melamine synthesis with combined recycle of off-gas, in which the combined off-gas streams are directly compressed and recycled to urea synthesis by multi-stage compression.

Figure 2:
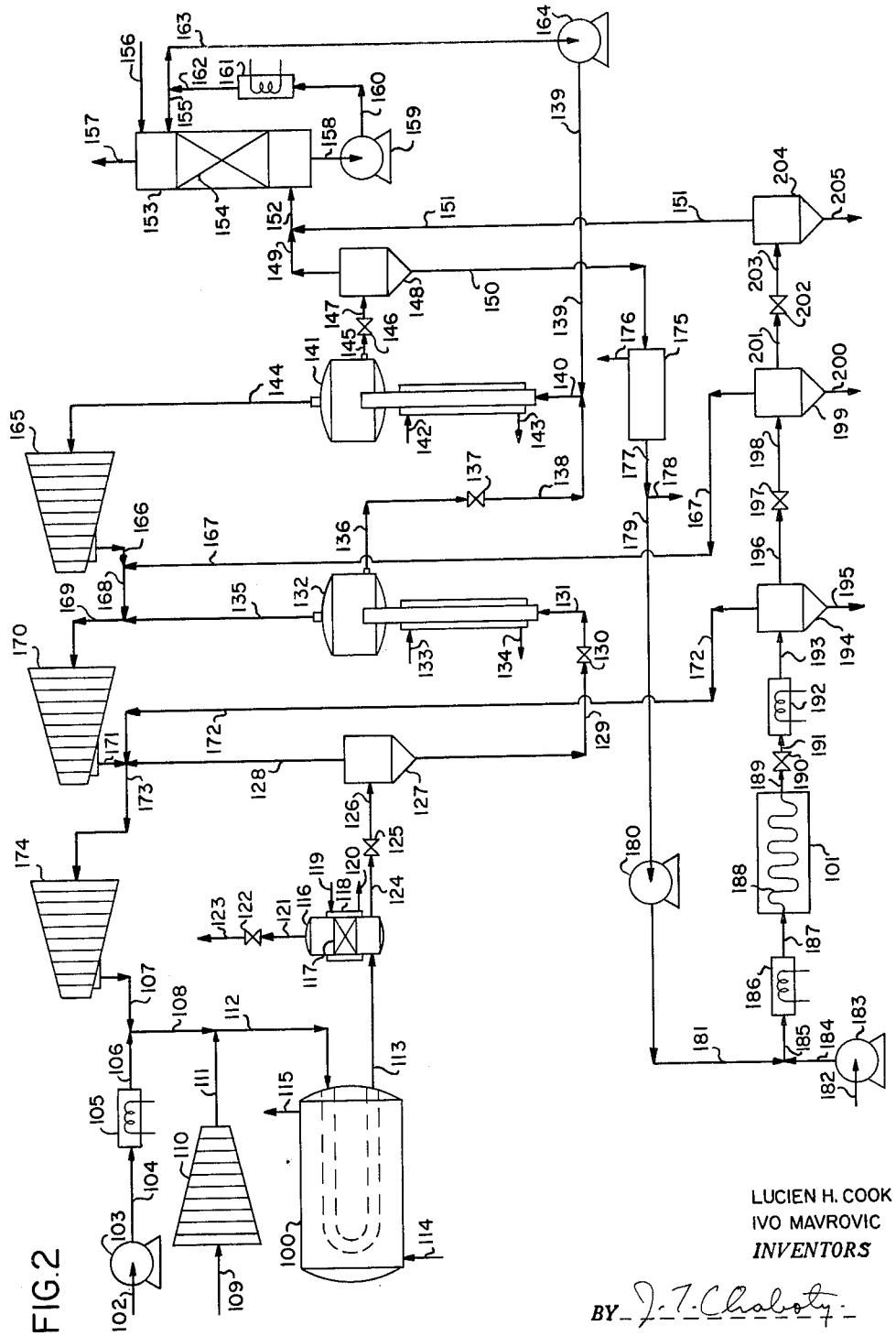

Referring now to FIGURE 1, combined urea and melamine synthesis processes are shown. The urea synthesis takes place in reactor 1 while melamine synthesis takes place in reactor 2. Referring first to urea synthesis, input gaseous carbon dioxide stream 3 is compressed in gas compressor 4 to urea synthesis pressure, and passes via 5 to heater 6. The heated and compressed carbon dioxide gas stream now passes via 7 to reactor 1.

Input liquid ammonia feed stream 8 is split, with a portion passing via 9 to melamine synthesis and the balance passing via 10 to urea synthesis. Stream 10 is combined with recycle liquid ammonia stream 11, and the combined stream is passed via 12 to pump 13. The liquid ammonia is thus pumped to urea synthesis pressure and passes via 14 to heater 15. The heated and pressurized liquid ammonia stream 16 now flows to reactor 1. A final urea synthesis component is recycle aqueous ammonium carbamate solution, which is passed via 17 to reactor 1.

Input streams 7, 16 and 17 react within reactor 1 at urea synthesis pressure, generally in the range of 2000 to 6000 p.s.i.g. Urea is formed by ammonium carbamate dehydration, and the resulting urea synthesis effluent stream 18 containing urea, ammonium carbamate, excess ammonia and water is produced. Stream 18 now passes through pressure reducing valve 19, and leaves valve 19 as stream 20 at a reduced pressure in the range of 200 p.s.i.g. to 400 p.s.i.g. Stream 20 passes to cyclonic flash separator 21 in which off-gas generated due to pressure reduction is separated from the liquid process stream. The off-gas is removed via 22, while the liquid stream passes via 23 to ammonium carbamate decomposer 24.

The liquid stream is heated in the lower part of unit 24, to produce further decomposition of ammonium carbamate. Unit 24 is thus heated by steam jacket 25, with steam inlet via 26 and condensate removal via 27. Separation of off-gas from the liquid process stream takes place in the upper section of unit 24. The resulting off-gas stream 28 is combined with stream 22, to form combined off-gas stream 29 at a pressure in the range of 200 p.s.i.g. to 400 p.s.i.g.

The residual liquid stream is removed from decomposer 24 via 30, and passes through pressure reducing valve 31. The liquid stream now passes via 32 into low pressure decomposer 33, at a pressure in the range of 5 p.s.i.g. to 50 p.s.i.g. In unit 33, decomposition of residual ammonium carbamate is carried out by further heating of the liquid process stream. This heating is carried out by contacting high pressure off-gas stream 29 with dilute aqueous ammonium carbamate solution 34, derived from a later stage of the process. This gas-liquid mixing takes place in jacket 35, which is disposed about the lower portion of unit 33. The resulting reactions, involving reformation of ammonium carbamate and dissolving of ammonia and carbon dioxide into the liquid phase, serve to generate heat which causes the ammonium carbamate decomposition inside unit 33. Separation of low pressure off-gas from the residual liquid process stream takes place in the upper section of unit 33. The resulting off-gas stream 36 is passed to further processing to be described infra, while the residual liquid stream 37 consisting of aqueous urea solution is passed to urea finishing operations to be described infra.

The mixed gas-liquid stream formed by the mixing of streams 29 and 34 is removed from jacket 35 via 38, and is passed into high pressure condenser-stripper unit 39 below packed section 40. Unit 39 serves to remove pure ammonia from stream 38, producing streams of pure ammonia and concentrated aqueous ammonium carbamate solution. The gaseous portion of stream 38 combines with off-gas stream 41, which is derived from melamine synthesis as described infra. The combined gaseous phase rises through packed section 40 in unit 39, countercurrent to descending aqueous ammonium carbamate solution which is admitted into units 39 via 42. The solution thus becomes heated and enriched in ammonium carbamate. The solution is withdrawn from unit 39 via 43, and passes through circulating pump 44 to discharge via 45. Stream 45 is split, with a major portion recycling and passing via 46, cooler 47 and stream 42 to unit 39. The balance of stream 45 is passed via 48 and pump 49 to urea synthesis as stream 17.

The rising gas phase inside unit 39 passes up from packed section 40 with substantially reduced carbon dioxide content. The balance of contained carbon dioxide is removed from the gas phase in upper reflux plates section 50, in which further cooling, condensation and reflux of the gas phase takes place. A final purified gas stream consisting of pure ammonia is removed from the top of unit 39 via 51 at a pressure in the range of 200 p.s.i.g. to 400 p.s.i.g., combined with recycle ammonia gas stream 52, and recycled to urea synthesis via 53. Stream 53 is condensed to liquid ammonia in cooler-condenser 54, and is withdrawn as liquid ammonia recycle stream 11.

Referring now to low pressure carbamate decomposer 33, low pressure mixed off-gas stream 36 is passed to low pressure condenser stripper 55. Unit 55 is similar in function and mode of operation to unit 39 described supra, except that unit 55 is operated at a lower pressure in the range of 5 p.s.i.g. to 50 p.s.i.g. Off-gas stream 36 is combined with melamine off-gas stream 56, which is derived from melamine synthesis in a manner to be described infra. The combined gas stream 57 now passes into unit 55 below packed section 58, and is cooled and partially condensed in section 58 by contact with descending ammonium carbamate solution. The rising gas stream is further cooled and refluxed in upper reflux plates section 59, and a residual gas phase consisting of pure ammonia is removed via 60, compressed to the range of 200 p.s.i.g. to 400 p.s.i.g. in compressor 61, and recycled to urea synthesis via 52.

The ammonium carbamate solution in the bottom of unit 55 is withdrawn via 62, pumped by circulating pump 63 and discharged via 64. Stream 64 is split, with a portion being recycled to unit 55 via 65, cooler 66 and line 67. The balance of stream 64 is passed via 68 to pump 69, pumped to the 200 p.s.i.g.–400 p.s.i.g. pressure level, and passed via 34 to shell 35 of unit 33.

Referring again to low pressure carbamate decomposer 33, product aqueous urea solution is withdrawn via 37, and passed to urea finishing operation. Thus stream 37 is typically passed to evaporator 70, for water removal via 71. Substantially anhydrous molten urea melt is discharged from unit 70 via 72. Stream 72 is now usually split, with a portion passing via 73 to conventional finishing operations such as prilling. The balance or all of stream 72 is passed via 74 to melamine synthesis as molten urea. Stream 74 is pumped to melamine synthesis pressure by pump 75, and discharged via 76.

Referring now to input ammonia stream 8, the portion 9 is pumped through pump 77 and discharged via 78 for combination with stream 76. The resulting combined urea-ammonia stream 79 is now heated and at least partially vaporized in preheater 80, and passed via 81 to a coil 82 suspended in radiant heating reactor 2 for melamine synthesis. The process stream inside coil 82 is maintained at suitable conditions for melamine synthesis, typically a pressure in the rang of 750 p.s.i.g. to 15,000 p.s.i.g. and temperature of 250° C. to 600° C. The resulting melamine synthesis effluent stream is discharged via 83, and principally contains melamine, ammonia and carbon dioxide. Stream 83 now passes through pressure reducing valve 84, with discharge via 85 at a pressure in the range of 200 p.s.i.g. to 400 p.s.i.g. Stream 85 is cooled in cooler 86 to condense melamine as solid product, and the resulting stream 87 is passed to cyclonic separator 88. The bulk of the melamine is separated via 89, with partial off-gas removal via 41 for recycle in a manner described supra. The residual process stream 90 now passes through pressure reducing valve 91, and is discharged at a pressure in the range of 5 p.s.i.g. to 50 p.s.i.g. as stream 92 which passes to final cyclonic separator 93. Here the residual melamine is removed via 94, and off-gas is recycled via 56 to urea synthesis in a manner described supra.

Referring now to FIGURE 2, an alternate version of the process of the present invention is presented. In FIGURE 2, combination of urea and melamine synthesis takes place via the combination of off-gas streams. The urea synthesis takes place in reactor 100 while melamine synthensis takes place in reactor 101. Referring first to urea synthesis, input liquid ammonia stream 102 is pumped to urea synthesis pressure by pump 103, discharged via 104, and vaporized in heater 105. The vaporized ammonia stream 106 is combined with recycle compressed off-gas stream 107 to form combined stream 108. Gaseous carbon dioxide feed stream 109 is compressed in compresssor 110 to urea synthesis pressure, discharged via 111 and combined with stream 108 to form gaseous urea synthesis feed stream 112. Stream 112 is now passed through the high pressure coil inside reactor 100 at urea synthesis pressure in the range of 2000 p.s.i.g. to 6000 p.s.i.g. Urea formation takes place, and urea process stream 113 is produced containing urea, ammonium carbamate, excess ammonia and water. The exothermic urea synthesis reaction is moderated by heat exchange with liquid water in unit 100. Thus, condensate water is admitted via 114 to unit 100, and the resulting steam is removed via 115. Saturated steam produced via 115 may be superheated by heat exchange with hot off-gas recycle stream 107, by means not shown.

Urea synthesis effluent stream 113 is now passed through inerts separator 116. In unit 116, inert gaseous components such as nitrogen and argon are removed, to prevent build-up of such components in the circulating system. Unit 116 is a high pressure vessel in which a pressure level is maintained equal to or greater than the autogenous pressure of stream 113. Thus, a gaseous stream of inerts plus ammonia, carbon dioxide and water vapor rises from the liquid phase in unit 116. The rising gaseous stream is cooled in packed section 117, provided with cooling jacket 118. Cooling water is admitted via 119 and discharged via 120. The rising ammonia, carbon dioxide and water vapor components are condensed and refluxed in section 117. A residual gaseous phase principally comprising inerts is thus formed in the upper section of units 116, removed via 121, and passed via control valve 122 to discharge via 123. Valve 122 serves to regulate the liquid level in unit 116.

The liquid phase is now removed from unit 116 via 124, and is substantially free of inerts. Stream 124 is now processed to separate an off-gas containing unconverted ammonia and carbon dioxide from the product aqueous urea solution. Thus, stream 124 is passed through pressure reducing valve 125, leaving as stream 126 at a pressure typically in the range of 1200 p.s.i.g. to 1700 p.s.i.g. Stream 126 is passed to cyclonic flash separator 127, which is any suitable vessel for physically separating evolved off-gas from the residual liquid solution. The off-gas, which is evolved due to pressure reduction, is removed from vessel 127 via 128. The residual liquid solution leaves vessel 127 via 129, and is passed through pressure reducing valve 130, leaving as stream 131 at a pressure typically in the range of 600 p.s.i.g. to 850 p.s.i.g.

Stream 131 is passed into ammonium carbamate decomposer unit 132, where decomposition of a portion of the ammonium carbamate in the stream is attained by suitable heating. Unit 132 may be of any suitable configuration, with one typical arrangement shown in FIGURE 2. Stream 131 is heated while passing upward through the lower steam-jacketed section of the unit, by steam passing into the jacket via 133 with condensate removal via 134. A portion of the ammonium carbamate present is decomposed to ammonia and carbon dioxide, and further off-gas is separated from residual liquid solution in the upper section of unit 132. The off-gas is removed via 135, while the residual liquid stream with lowered ammonium carbamate content is withdrawn via 136, and is passed through pressure reducing valve 137, leaving as stream 138 at a pressure typically in the range of 275 p.s.i.g. to 500 p.s.i.g.

Stream 138 is combined with aqueous recycle stream 139, which is derived in a manner to be described infra. The combined stream 140 is passed into ammonium carbamate decomposer unit 141, where decomposition of a further portion of the ammonium carbamate in the stream is attained by suitable heating. Unit 141 is similar to unit 132 described supra. Thus, stream 140 rises through the lower steam jacketed section of unit 141, which is heated by steam admitted via 142 with condensate removal via 143. The decomposition of most of the remaining ammonium carbamate present in the liquid stream is thus achieved.

The mixed off-gas generated in unit 141 is removed via 144, and the residual liquid stream with minor ammonium carbamate content is withdrawn via 145, and is passed through pressure reducing valve 146, leaving as stream 147 at a pressure typically in the range of 5 p.s.i.g. to 50 p.s.i.g. Stream 147 is now passed to cyclonic separator 148, which is a unit similar to vessel 127 described supra. Due to the lowered pressure level and elevated temperature of the process stream in unit 148, the balance of contained ammonium carbamate is decomposed and evolved via 149 as a mixed off-gas. The residual liquid stream consisting of product aqueous urea solution is withdrawn via 150 and passed to product utilization in melamine synthesis, to be described infra.

Final off-gas stream 149 is now combined with low pressure off-gas stream 151, derived from melamine synthesis as described infra. The combined off-gas stream 152 is now passed to absorber 153, which is provided with a packed section 154 or other gas-liquid contact means. A circulating stream 155 consisting of aqueous absorbent solution is passed into unit 153 above packed section 154, and passes downward countercurrent to the rising gas stream. Ammonia and carbon dioxide from stream 152 are absorbed into the liquid solution. A small stream 156 consisting of makeup water is admitted into the top of unit 153, while inerts are discharged from the system via 157. Stream 156 may be omitted in some cases, depending on the relative proportion of water in stream 155. The scrubbing solution is removed via 158 from the bottom of unit 153, passed via pump 159 and line 160 to cooler 161 where the stream is suitably cooled, removed via 162, and partially recycled via 155 to unit 153. The balance of stream 162 is passed via 163 to pump 164, and is compressed to a pressure in the range of 275 p.s.i.g. to 500 p.s.i.g. for recycle via 139. The ammonia and carbon dioxide content of stream 139 is thus recycled to urea synthesis via 144. It will be understood that stream 152 may alternatively be recycled to urea synthesis by gas recompression, as is the case with streams 128, 135 and 144 to be described infra. This alternative is less desirable because of high compression cost for recompression from the low pressure level of stream 152.

Referring now to decomposer unit 141, mixed off-gas stream 144 is passed to unit 165, which is an axial or centrifugal compressor of conventional design. Here the off-gas is compressed to an elevated pressure level equal to that of the off-gas generated in the next higher stage of carbamate decomposition. The resulting compressed off-gas stream 166 is combined with off-gas stream 167 derived from melamine synthesis at intermediate pressure in the range of 600 p.s.i.g. to 850 p.s.i.g., and the resulting combined off-gas stream 168 is now combined with off-gas stream 135 derived from carbamate decomposition in unit 132. The combined off-gas stream 169, at a pressure level in the range of 600 p.s.i.g. to 850 p.s.i.g., is now passed into compressor unit 170, which is similar to unit 165 described supra. The resulting compressed off-gas stream 171 is discharged at a pressure level in the range of 1200 p.s.i.g. to 1700 p.s.i.g., and is combined with off-gas stream 172 derived from melamine synthesis and also with off-gas stream 128 derived from unit 127. The final combined off-gas stream 173 is now passed into the final compressor unit 174, which is similar to unit 165 described supra. In unit 174, the total combined off-gas stream is compressed to final urea synthesis pressure in the range of 2000 p.s.i.g. to 6000 p.s.i.g. The final compressed off-gas is discharged via 107, and is recycled to urea synthesis in a manner described supra.

Referring now to unit 148, product aqueous urea solution is withdrawn via 150, and passed to urea finishing operations and melamine synthesis. Thus, stream 150 is typically passed to evaporator 175, for water removal via 176. Substantially anhydrous molten urea melt is discharged from unit 175 via 177. Stream 177 is now usually split, with a portion passing via 178 to conventional finishing operations such as prilling. The balance or all of stream 177 is passed via 179 to melamine synthesis as molten urea. Stream 179 is pumped to melamine synthesis pressure by pump 180, and discharged via 181.

Auxiliary input ammonia stream 182 is pumped through pump 183 and discharged via 184 for combination with stream 181. The resulting combined urea-ammonia stream 185 is now heated and at least partially vaporized in preheater 186, and passed via 187 to a coil 188 suspended in radiant heating reactor 101 for melamine synthesis. The process stream inside coil 188 is maintained at suitable conditions for melamine synthesis, typically at a pressure in the range of 1200 p.s.i.g. to 15,000 p.s.i.g. and temperature of 250° C. to 600° C. The resulting melamine synthesis effluent stream is discharged via 189, and principally contains melamine, ammonia and carbon dioxide. Stream 189 now passes through pressure reducing valve 190, with discharge via 191 at a pressure in the range of 1200 p.s.i.g. to 1700 p.s.i.g.

Stream 191 is cooled in cooler 192 to condense melamine as solid product, and the resulting stream 193 is passed to cyclonic separator 194. The bulk of the melamine is separated via 195, with partial off-gas removal via 172 for recycle in a manner described supra. The residual process stream 196 now passes through pressure reducing valve 197, and is discharged as stream 198 at a pressure in the range of 275 p.s.i.g. to 500 p.s.i.g. Stream 198 now passes to intermediate cyclonic separator 199. Here further melamine is removed via 200, and off-gas is recycled via 167 to urea synthesis in a manner described supra. The residual process stream 201 now passes through pressure reducing valve 202, and is discharged at a pressure in the range of 5 p.s.i.g. to 50 p.s.i.g. as stream 203, which passes to final cyclonic separator 204. Here the final portion of solid melamine is removed via 205, and off-gas is recycled via 151 to urea synthesis in a manner described supra.

Numerous alternatives within the scope of the present invention will occur to those skilled in the art. Thus, the ranges of process variables such as pressure recited supra represent only preferred embodiments of the present invention. In addition, other suitable means of off-gas recycle besides those described and illustrated in FIGURES 1 and 2 will occur to those skilled in the art. Referring now to FIGURE 2, input ammonia stream 102 may be eliminated in some cases, with all of the makeup ammonia being passed to the urea synthesis process via stream 182, with subsequent ammonia recycle via streams 172, 167 and 151.

The number of stages of off-gas generation from melamine synthesis may be varied, and is not dependent on the number of stages of off-gas generation from urea synthesis. Thus, referring to FIGURE 2, residual melamine plus off-gas stream 201 could be eliminated if desired, with total drawoff of residual off-gas via 167.

What we claim is:

1. In the process of melamine synthesis from urea wherein ammonia, carbon dioxide and recycled aqueous ammonium carbamate solution are reacted at elevated pressure to form urea, the urea synthesis stream is heated at reduced pressure to decompose unconverted ammonium carbamate and generate a first off-gas containing ammonia and carbon dioxide, said first off-gas is cooled and scrubbed with aqueous ammonium carbamate scrub solution to condense carbon dioxide as ammonium carbamate, residual first off-gas is further cooled and refluxed to condense the balance of contained carbon dioxide and produce a residual gas stream of pure ammonia, said residual ammonia gas stream and a portion of said scrub solution are recycled to urea synthesis, the residual urea synthesis stream remaining after separation of said first off-gas is further processed to convert its urea content to substantially anhydrous urea, and said urea is heated at elevated pressure and together with added ammonia to form melamine and generate a second off-gas containing ammonia and carbon dioxide, the improvement which comprises adding said second off-gas to said first off-gas, and contacting the combined off-gas stream with said aqueous ammonium carbamate scrub solution.

2. In the process of melamine synthesis from urea wherein ammonia, carbon dioxide and recycled aqueous ammonium carbamate solution are reacted at elevated pressure to form urea, the urea synthesis stream is heated in a plurality of stages at successively reduced pressure to decompose unconverted ammonium carbamate and generate a plurality of partial off-gas streams containing ammonia and carbon dioxide, said partial off-gas streams are cooled and scrubbed with aqueous ammonium carbamate scrub solutions to condense carbon dioxide as ammonium carbamate, the residual partial off-gas streams are further cooled and refluxed to condense the balance of contained carbon dioxide and produce residual gas streams of pure ammonia, said residual ammonia gas streams and a portion of at least one of said scrub solutions are recycled to urea synthesis, the residual urea synthesis stream remaining after separation of said partial off-gas streams is processed to convert its urea content to substantially anhydrous urea, and said urea is heated at elevated pressure and together with added ammonia to form melamine the improvement which comprises separating residual off-gas from said melamine in a plurality of stages at successively reduced pressure levels equivalent to the pressure levels at which said decomposition of ammonium carbamate was carried out, adding residual off-gas derived from melamine synthesis at each stage of pressure level to the carbamate decomposition off-gas of corresponding pressure level, and contacting the resulting combined off-gas streams with said aqueous ammonium carbamate scrub solutions.

3. Process of claim 2, in which there are two stages of carbamate decomposition and partial off-gas generation, and also of melamine off-gas generation, the first stage being at a pressure in the range of 200 p.s.i.g. to 400 p.s.i.g., and the second stage being at a pressure in the range of 5 p.s.i.g. to 50 p.s.i.g.

4. In the process of melamine synthesis from urea wherein ammonia, carbon dioxide and recycled aqueous ammonium carbamate solution are reacted at a pressure in the range of 2000 p.s.i.g. to 6000 p.s.i.g. to form urea, the urea synthesis stream is heated at a pressure of 200 p.s.i.g. to 400 p.s.i.g. to decompose a portion of the unconverted ammonium carbamate and generate a first urea synthesis off-gas containing ammonia and carbon dioxide, the residual urea synthesis stream is heated at a pressure of 5 p.s.i.g. to 50 p.s.i.g. to decompose the balance of the unconverted ammonium carbamate and generate a second urea synthesis off-gas containing ammonia and carbon dioxide, said first and second off-gas streams are cooled and scrubbed at their respective pressure levels with aqueous ammonium carbamate scrub solutions to condense carbon dioxide as ammonium carbamate, the residual off-gas streams are further cooled and refluxed to condense the balance of contained carbon dioxide and produce residual gas streams of pure ammonia, said residual ammonia gas streams and a portion of said scrub solutions are recycled to urea synthesis, the residual urea synthesis stream remaining after separation of said second off-gas is processed to convert its urea content to substantially anhydrous urea, said urea is heated to a temperature of 250° C. to 600° C. at a pressure of 750 p.s.i.g. to 15,000 p.s.i.g. together with added ammonia to form melamine vapor together with an off-gas containing ammonia and carbon dioxide, the melamine synthesis stream is cooled to condense solid melamine, and the solid melamine is separated from the melamine off-gas at reduced pressure, the improvement which comprises separating a first partial melamine off-gas at a pressure in the range of 200 p.s.i.g. to 400 p.s.i.g., separating a residual melamine off-gas at a pressure in the range of 5 p.s.i.g. to 50 p.s.i.g., combining said first partial melamine off-gas with said first urea synthesis off-gas, combining said residual melamine off-gas with said second urea synthesis off-gas, and scrubbing the combined streams with said aqueous ammonium carbamate scrub solutions.

5. In the process of melamine synthesis from urea wherein ammonia, carbon dioxide and compressed recycle off-gas derived from ammonium carbamate decomposition are reacted at elevated pressure to form urea, the urea synthesis stream is heated in a plurality of stages at successively reduced pressure to decompose unconverted ammonium carbamate and generate a plurality of partial off-gas streams containing ammonia and carbon dioxide, said partial off-gas streams are compressed, combined and recycled to urea synthesis as said compressed recycle off-gas, the residual urea synthesis stream remaining after separation of said partial off-gas streams is processed to convert its urea content to substantially anhydrous urea, and said urea is heated at elevated pressure together with added ammonia to form melamine, the improvement which comprises separating residual off-gas from said melamine in a plurality of stages at successively reduced pressure levels equivalent to the pressure levels at which said decomposition of ammonium carbamate was carried out, adding residual off-gas derived from melamine synthesis at each stage of pressure level to the carbamate decomposition off-gas of corresponding pressure level, compressing the combined off-gas streams to urea synthesis pressure, and recycling the compressed combined stream to urea synthesis as said compressed recycle off-gas.

6. Process of claim 5, in which the combined off-gas stream produced at each pressure level is recycled by being compressed to the next higher pressure level, combined with the off-gas stream produced at the higher pressure level, and the total combined off-gas stream is compressed to the next succeeding higher pressure level.

7. Process of claim 5, in which the first stage of carbamate decomposition and off-gas generation in urea synthesis is obtained by pressure reduction without external heating.

8. In the process of melamine synthesis from urea wherein ammonia, carbon dioxide and compressed recycle off-gas derived from ammonium carbamate decomposition are reacted at a pressure in the range of 2000 p.s.i.g. to 6000 p.s.i.g. to form urea, the pressure of the resulting urea synthesis stream is reduced to the range of 1200 p.s.i.g. to 1700 p.s.i.g. whereby a portion of the unconverted ammonium carbamate in the stream is decomposed to evolve a first off-gas containing ammonia and carbon dioxide, the residual urea synthesis stream is heated at a pressure in the range of 600 p.s.i.g. to 850 p.s.i.g. to decompose additional ammonium carbamate and produce a second off-gas, the residual urea synthesis stream is heated at a pressure in the range of 275 p.s.i.g. to 500 p.s.i.g. to decompose additional ammonium carbamate and produce a third off-gas, the pressure of the residual urea synthesis stream is reduced to the range of 5 p.s.i.g. to 50 p.s.i.g. whereby the balance of residual ammonium carbamate is decomposed and a fourth off-gas is evolved, said fourth off-gas is absorbed in recycling aqueous ammonium carbamate solution, a portion of said solution is combined with said residual urea synthesis stream at a pressure in the range of 275 p.s.i.g. to 500 p.s.i.g., said third off-gas is compressed to the pressure of said second off-gas and combined therewith, the combined off-gas stream is compressed to the pressure of said first off-gas and combined therewith, the final combined off-gas stream is compressed and recycled to urea synthesis as said compressed recycle off-gas, the residual urea synthesis stream remaining after separation of said partial off-gas streams is processed to convert its urea content to substantially anhydrous urea, and said urea is heated to a temperature of 250° C. to 600° C. at a pressure of 1200 p.s.i.g. to 15,000 p.s.i.g. together with added ammonia to form melamine vapor together with an off-gas containing ammonia and carbon dioxide, the melamine synthesis stream is cooled to condense solid melamine, and the solid melamine is separated from the melamine off-gas at reduced pressure, the improvement which comprises separating a first partial melamine off-gas at a pressure in the range of 1200 p.s.i.g. to 1700 p.s.i.g., separating a second partial melamine off-gas at a pressure in the range of 600 p.s.i.g. to 850 p.s.i.g., separating a residual melamine off-gas at a pressure in the range of 5 p.s.i.g. to 50 p.s.i.g., combining said first partial melamine off-gas with said first urea synthesis off-gas, combining said second partial melamine off-gas with said second urea synthesis off-gas, combining said residual melamine off-gas with said fourth urea synthesis off-gas, and compressing the combined streams for recycle to urea synthesis.

9. In the process of melamine synthesis from urea wherein ammonia, carbon dioxide and recycled aqueous ammonium carbamate solution are reacted at elevated pressure to form a mixed process stream containing urea, said mixed process stream is processed to separate substantially anhydrous urea from unconverted process components, said anhydrous urea is heated at elevated pressure and together with added ammonia to form a gaseous stream containing melamine vapor, ammonia and carbon dioxide, said gaseous stream is cooled to condense melamine and produce a residual off-gas stream containing ammonia and carbon dioxide, the improved method of recycling said off-gas stream to urea synthesis which comprises cooling and scrubbing said off-gas stream with aqueous ammonium carbamate scrub solution to condense a portion of the carbon dioxide as ammonium carbamate, further cooling and refluxing the residual off-gas stream to condense the balance of contained carbon dioxide as ammonium carbamate and produce a residual gas stream of pure ammonia, and recycling said pure ammonia gas stream and a portion of said ammonium carbamate scrub solution to urea synthesis.

References Cited by the Examiner

UNITED STATES PATENTS

| | | | |
|---|---|---|---|
| 2,527,315 | 10/1950 | Mackay | 260—249.7 |
| 2,684,964 | 7/1954 | Heckel | 260—249.7 |
| 2,950,173 | 8/1960 | Baroni et al. | 260—249.7 XR |

FOREIGN PATENTS 583,504  12/1946  Great Britain.

WALTER A. MODANCE, *Primary Examiner.*

NICHOLAS S. RIZZO, *Examiner.*